United States Patent [19]
Currie

[11] 3,856,158
[45] Dec. 24, 1974

[54] MEANS FOR PALLETIZING OPEN FLAPPED CARTONS AND THE LIKE IN A PALLET LOADING MACHINE

[75] Inventor: Richard W. Currie, Saratoga, Calif.

[73] Assignee: Currie Machinery Company, Santa Clara, Calif.

[22] Filed: Nov. 26, 1973

[21] Appl. No.: 418,945

[52] U.S. Cl.................. 214/6 DK, 53/164, 214/6 H
[51] Int. Cl............................................. B65g 57/24
[58] Field of Search................ 214/6 DK, 6 H, 6 P; 53/164

[56] References Cited
UNITED STATES PATENTS

| | | | |
|---|---|---|---|
| 2,675,928 | 4/1954 | Slater | 214/6 H |
| 3,059,787 | 10/1962 | Forsyth | 214/6 P |
| 3,624,782 | 11/1971 | McPeek et al. | 214/6 P |

*Primary Examiner*—Robert G. Sheridan
*Assistant Examiner*—Leslie J. Paperner

[57] ABSTRACT

An accessory for pallet loading machines in which a light beam between a light source and a photo sensitive cell in the control circuit effects stoppage of an elevator by obstructions of the light beam upon arrival of the uppermost cartons on the elevator adjacent a stripper plate to receive the next layer of cartons therefrom; a member for depressing open flaps on the uppermost layer of cartons likely to obstruct the light beam before arrival of such layer of cartons in a proper position to receive the next layer thereof and a blinder on such member for obstructing the light beam when said member engages upstanding necks of bottles misaligned vertically relative to the light beam for stopping the elevator at the proper time for safe deposit of the next layer of cartons thereonto from the stripper plate. This invention has its environment in pallet loading machines by which cartons are stacked in interlocking relation on pallets for mass handling, storage and/or shipping. The invention herein relates to means for facilitating the palletizing of open flapped cartons in conventional pallet loaders and more particularly to a flap depressor for pallet loaders in which open lidded cartons are to be palletized.

5 Claims, 8 Drawing Figures

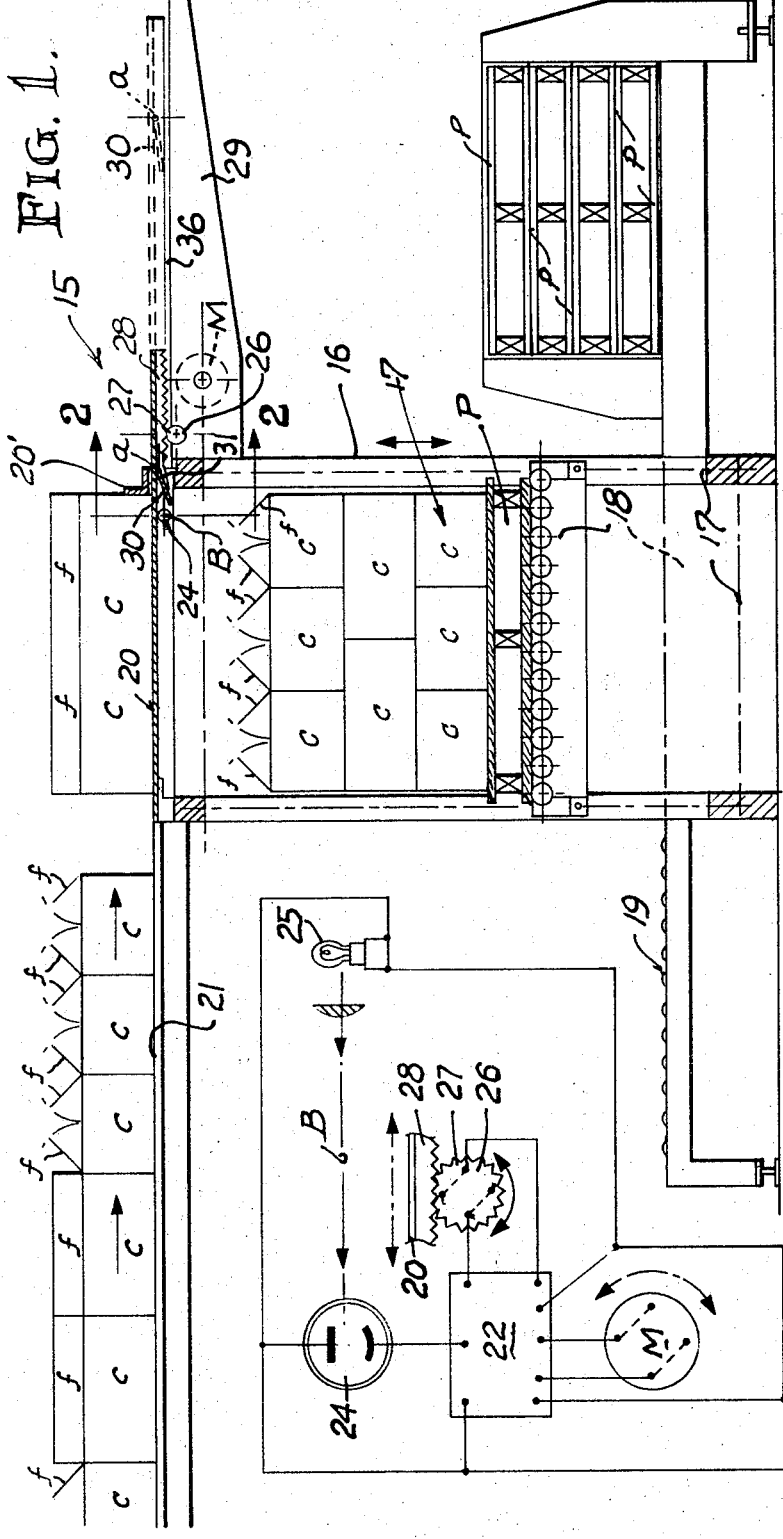
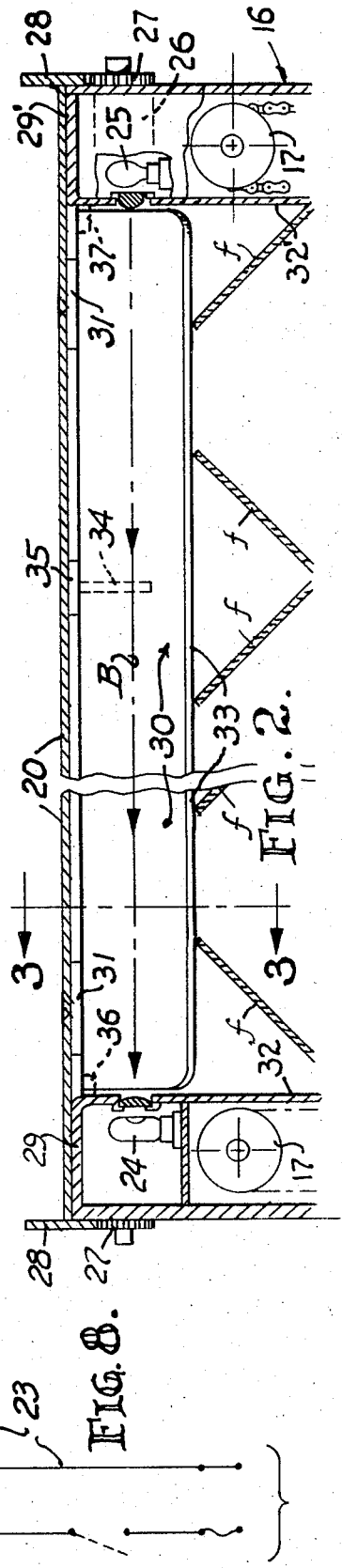

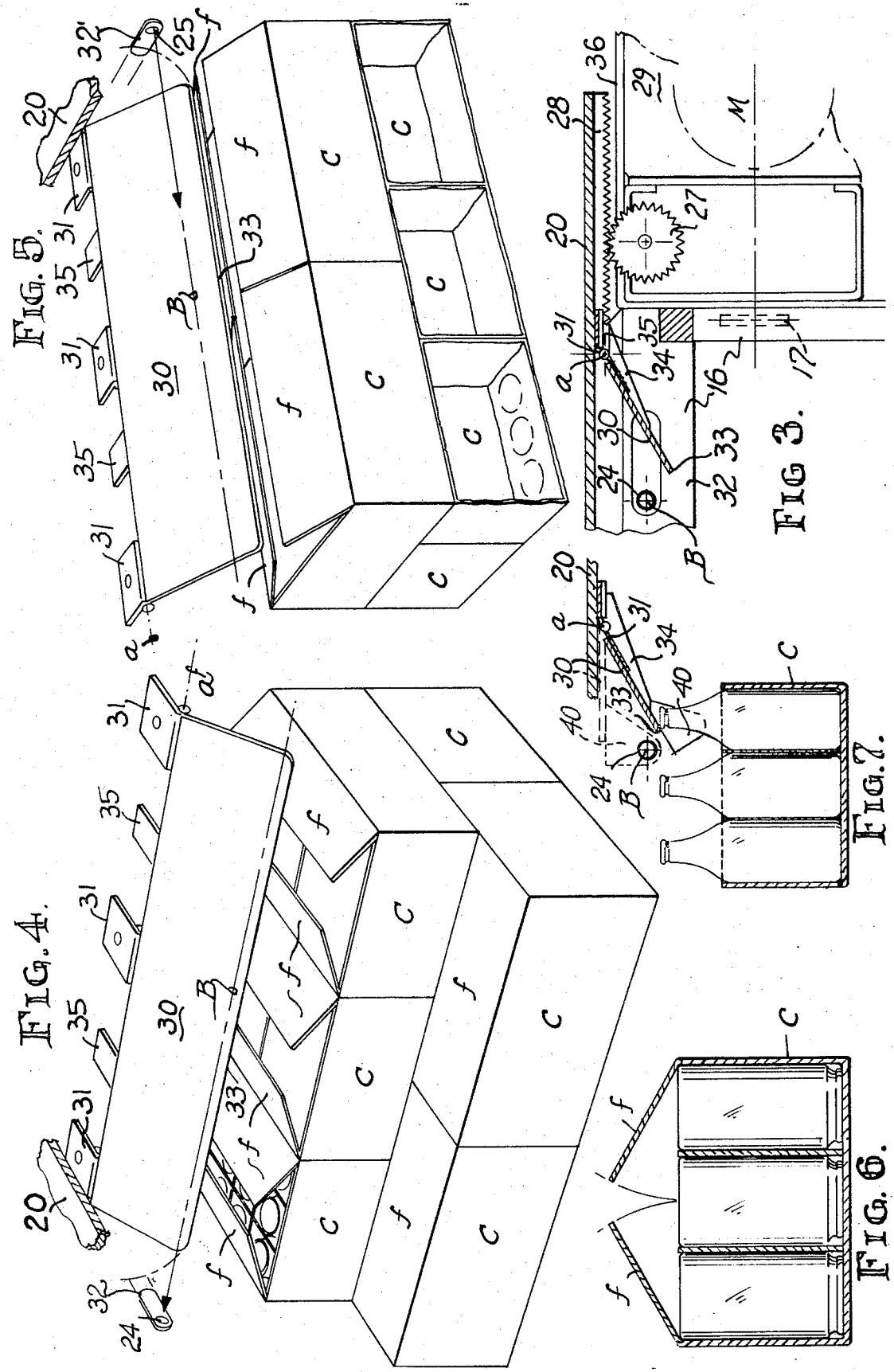

MEANS FOR PALLETIZING OPEN FLAPPED CARTONS AND THE LIKE IN A PALLET LOADING MACHINE

BACKGROUND OF THE INVENTION

Pallet loaders are well known in the art. See for example U.S. Pat. No. 2,796,179 dated June 18, 1957 to Van Vleek or U.S. Pat. No. 2,883,074 dated Apr. 21, 1959 to Boehl. In general they include a pallet elevator arranged in a frame for raising and lowering a single pallet up and down between a low and high level to receive, in cycles, layers of cartons arranged in the desired pattern upon a stripper plate above the elevator. Each layer of cartons is fed onto the stripper plate in groups alternately arranged lengthwise or crosswise for interlocking purpose. As each group or layer of cartons arrives on the stripper plate, the elevator lifts the pallet in steps determined by the height or depth of cartons thereon. The uppermost layer of cartons stops just below the stripper plate which is then automatically withdrawn to allow the infed cartons on the plate to be deposited onto the pallet or the uppermost layer of cartons on the pallet. The elevator is caused to stop at the proper position in which the upper surface of the uppermost layer of cartons arrives slightly below the stripper plate so that the layer of cartons being deposited therefrom are lowered a distance slightly greater than the thickness of the stripper plate. In its simplest form, the stopping of the elevator at the proper level is caused by the uppermost carton obstructing a light beam in a circuit including the cycle contol.

Such operation is easily controlled when all cartons are closed with their flaps glued down. However, when the cartons are for empty containers such as glass jars or bottles supplied in cartons with their flaps unsealed and open, the open flaps can cause obstruction of the light beam and upset the cycle of operation. In other words, the elevator may be stopped by the upwardly extending flaps a considerable distance below the stripper plate causing too great a drop of the cartons therefrom onto the stack of cartons on the pallet. This results in irregular positioning of the layer of cartons, tipping thereof and even breakage of glass containers in the cartons.

Moreover, in the case of palletizing six packs or cartons of bottles having their necks extending beyond the side walls of the cartons, a further problem is involved. In such case the light beam may not be obstructed as the cap or open end level of such bottles reach the horizontal plane of the light beam. Consequently, the elevator platform with cartons of bottles thereon would continue to ascend into crushing contact with the underside of the stripper plate.

The present invention comtemplates the provision of means for overcoming these problems in a conventional pallet loading machine.

STATEMENT OF THE INVENTION

It is an object of this invention to provide a means for depressing those of the open flaps on the uppermost layer of cartons in the range or area of the light beam so that the flaps will not obstruct the beam of light and set up the stop cycle of the elevator.

It is a further object to provide a flap depressor means which is simple in construction, economical to manufacture and highly efficient in use.

It is another object to provide a flap depressor which will function for either open flap cartons or six pack type of bottle carrying cartons.

It is yet another object to provide a light beam obstructing means on the flap depressor for obstructing the light beam at substantially the time of arrival of the top surface of a layer of cartons or article on the elevator for stopping the elevator according to the conventional timing of palletizer coded control.

The foregoing objects seek to alleviate the problem without changing the circuity for the cycle control or the introduction of costly stop means requiring any material alteration or modification of the existing structure of the pallet loader and its mechanisms.

These and objects and advantages of the present invention will become more apparent from a reading of the following description and claims in the light of the accompanying two sheets of drawing in which:

FIG. 1 is a section through a pallet loading machine lengthwise the train of movement of cartons thereinto;

FIG. 2 is a fragmentary cross section through FIG. 1 taken substantially along line 2—2 therein to show the flap depressor of the present invention;

FIG. 3 is a fragmentary detail section through FIG. 2 showing the flap depressor of FIG. 1 at enlarged scale;

FIG. 4 is a perspective view of the flap depressor of FIGS. 1, 2 and 3 in relation to a stack of open lidded cartons about to be elevated;

FIG. 5 is a view similar to that of FIG. 4 showing cartons with open flaps disposed transversly thereof;

FIG. 6 is an enlarged section through an open lidded carton containing glass jars;

FIG. 7 is a section through a six pack carton of bottles in relation to the flap depressor and light beam obstructer therefor in accordance with the present invention.

FIG. 8 is a diagram of the electric circuit of the present invention.

GENERAL DESCRIPTION

Referring to FIG. 1 a pallet loader is generally designated 15 and of conventional design. It includes a frame 16 having an elevator shaft of a desired height for an elevator 17 supporting a platform 18 for up and down movement between the level of a discharge conveyor 19 at a lower level and a stripper plate 20 at a higher level, i.e. on top of the frame 16. Packing boxes or cartons C are moved onto the stripper plate 20 from a conveyor 21 at the higher level. The cartons C have previously been arranged in groups according to a programmer so that each group, consisting of a horizontal layer is adapted to fit upon a paller P. The pallet P has been previously placed on the platform 18 of the elevator 17 from a storage hopper adjacent the elevator. Each layer of cartons C is grouped with the length of the cartons either common to the direction of movement of the conveyor 21 or crosswise thereto so as to interlock one layer with upper and lower layers thereof as illustrated on the elevator platform 18 in FIG. 1 or as depicted in FIGS. 4 and 5. Each layer of cartons C fed onto the stripper plate 20 is stopped directly above the elevator shaft by a cross bar 20' (FIG. 1).

The elevator 17 is raised and lowered by an electrical motor M in accordance with a cycle control 22 in an electrical circuit 23 (FIG. 8) responsive to a photo electric cell means 24 energized by a beam of light B from a light source 25 across the elevator shaft. The light beam B traverses the elevator frame 16 just below the stripper plate 20. When the light beam impinges upon the photo cell 24, circuit to the elevator 17 is complete. However, when the light beam B is obstructed by an object passing between the photo cell 24 and light source 25, the circuit to the elevator 17 stops. For example, at the start of each cycle of operation the pallet loader 15, a pallet P is placed on the platform 18 of the elevator 17. The elevator lifts the pallet up to a level where the pallet obstructs the light beam B. With a slight delay for override, the upper surface S of the pallet stops slightly below the stripper plate 20. A time delay relay (not shown) in the cycle control 22 then establishes circuit to a drive motor 26 for a pinion gear 27. The pinion gear 27 is in mesh with a rack bar 28 secured to the stripper plate 20. By this arrangement, the stripper plate 20 is withdrawn from above the elevator shaft on guide rails 29–29' extending laterally from the frame 16 (FIG. 1) allowing the layer of cartons C on the stripper plate to be deposited onto the pallet P.

Suitable stop switches (not shown) at the limit of movement of the stripper plate 20 function in a conventional manner to re-establish circuit to a time delay relay in the cycle control 22 to reverse the operation of the motor M and lower the platform of the elevator with the layer of cartons thereon. Meantime the stripper plate 20 is returned to a position above the elevator shaft and the limit switch contacted by the stripper plate 20 closed to reset the time delay relay in the cycle control. Sufficient time is then allowed for the next layer of cartons C to be moved from the conveyor 21 onto the stripper plate 20. During the time that the new layer of cartons C are placed on the stripper plate 20, the elevator platform 18 has been lowered to a position in which the layer of cartons C thereon pass below the light beam B. Within the cycle control, the circuit 23 to the motor M may then be stopped and reversed to a condition ready to raise the platform 18 until the light beam B is again obstructed. The foregoing cycle is then repeated to build up a stack of layers of cartons C in interlocked relation as illustrated in FIG. 1.

All of the foregoing structure and operation is well known in the art and forms no part of this invention except insofar as it provides an environment for the invention now to be described in detail.

DETAILED DESCRIPTION OF THE INVENTION

As best illustrated in FIGS. 1, 4, 5 and 6 due to the ecological trend toward the packaging and sales of comestibles in glass, the glass jars and bottles are now sent to canners and packing houses in open lidded cartons. As a rule, empty glass jars are inserted into the cartons open end down and the open lidded cartons stored flap side up in stacked relation on pallets until time of use. At that time the flaps $f$ are folded back and the cartons inverted so as to remove the jars en masse therefrom open end up on a conveyor feeding toward a filling machine.

The palletizing of open lidded cartons with flaps $f$ up in pallet loaders 15 as explained above posed a problem. The open flaps $f$ extending angularly upward arrive at and pass the light beam B when the carton is too great a distance from the stripper plate 20. This stops the elevator 17 before the upper surface of the topmost layer of cartons is close enough to the stripper plate 20 to safely receive the layer of glass filled cartons therefrom. As the stripper plate 20 is withdrawn, the cartons are no longer but only partially supported thereon. They would therefore drop down at an angle and become tilted and misaligned relative to the stack on the elevator. Undue breakage, chipping and/or cracking of the glass would occur. The cycle of operation would be disrupted from its normal pattern in which the flaps are sealed and the cartons closed.

The present invention resides in a flap depressor 30 arranged in the frame 16 of the elevator 17 and extending into the elevator shaft in the region of the light beam B. As best seen in FIGS. 1 and 3 the flap depressor 30 is a rectangular member having one edge hingedly mounted on the lower surface of the stripper plate 20 by hinges 31. One wing of each hinge 31 is secured to the stripper plate and the other wing to the flap depressor for effecting swinging movement of the latter about an axis $a$ parallel to the light beam B. The flap depressor member 30 normally extends completely across the elevator shaft of the frame 16 when the stripper plate 20 is in carton receiving position as shown in FIGS. 1 and 2. In that event, the flap depressor is between the housing 32 and 32' for the photo electric cell 24 and the light source 25, respectively. The free edge 33 of the flap depressor member 30 is a predetermined distance radially from the axis $a$ of its hinged connection to the stripper plate 20. This radial distance or length of the edge 33 from the axis $a$ is slightly less than the distance of the latter from the light beam B when the stripper plate is in carton receiving position above the elevator shaft as in FIG. 1.

The flap depressor 30 normally hangs downward in the elevator shaft at an angle such as to dispose its free edge 33 in a horizontal plane below that of the light beam B. To accomplish this, the flap depressor 30 has several web-like rib members 34 extending its radial length and provided with a stop pad 35 at the angle desired for engagement with the underside of the stripper plate. In this position, the edge 33 of the flap depressor is disposed to engage an upturned open flap $f$ approaching the stripper plate 20 before such flap $f$ can obstruct the light beam B. The flap depressor 30 is slightly heavier than the resistance offered by the open flap $f$ and consequently depresses the latter toward closed condition on its carton before the carton reaches the light beam B. Thereafter continued ascension of the pallet and stack of cartons C thereon continues and causes the flap depressor to swing upwardly toward parallelism with the stripper plate 20.

As hereinbefore explained as soon as a carton in the topmost layer thereof obstructs the light beam B, the photo electric cell 24 is de-energized to effect the time delay by a relay within the cycle control. The usual override of the elevator 17 occurs and the top surface of the uppermost layer of cartons C will be disposed in close proximity to the underside of the stripper plate 20 to safely receive the next layer of cartons C therefrom.

As the stripper plate 20 is withdrawn to the righthand side as illustrated in FIG. 1 its outer edges become supported on the guide rails 29–29'. The guide rails 29–29' have ledges 36 and 37, respectively, formed thereon adjacent the walls of the frame 16 in which the photo cell 24 and light source 25 are mounted. The outer edges 34 and 35 become supported on the ledges of the guide rails 29–29' respectively FIG. 2. This maintains the flap depressor 30 in its raised condition substantially parallel to the stripper plate 20 during its withdrawal period.

After the layer of cartons deposited on the stack thereof on the elevator platform descends well below the light beam B, the stripper plate returns to cover the open upper end of the elevator shaft. The flap deressor 30 returning with the stripper plate 20 rides off the ledges 36 and 37 and by its own weight again assumes its own downwardly extending angular position with the elevator shaft ready to depress the flap f of a carton in the topmost layer thereof on the stack supported on the platform of the elevator 17.

It will be noted in FIGS. 4 and 5 that since each layer of cartons C is alternately positioned at 90 degrees to the one above or below, the flaps f may be transverse to (as in FIG. 4) or parallel with (as in FIG. 5) the hinged side of the flaps. In either case, the flap f disposed to rise in a plane likely to traverse the light beam B will first be engaged by the free edge 33 of the flap depressor 30. Such flap f will be pressed down to closed condition by the flap depressor 30 to assure proper stopping of the elevator when the carton itself obstructs the beam B according to the usual cycle of operation.

In FIG. 7 a condition is shown wherein six packs of bottles may be palletized. In such case, it will be noted that the necks of the bottles may be so arranged as to be out of a plane of vertical alignment, i.e., offset with respect to the light beam B. Here it is important to provide an obstructing means 40 on the flap depressor 30 in order to commence the stopping of the elevator according to the cycle of operation. In other words, in the absence of such beam obstructing means 40 the upper cap ends of the bottles would be raised into physical contact with the underside of the stripper plate 20 before the elevator is stopped. The bottles could not withstand such contact and pressure against the plate 20 and would be broken.

The beam obstructing means 40 is mounted on the flap depressor 30 so as to move therewith, when the latter is lifted by engagement with the tops of the bottles being elevated by the elevator 17. The obstructing means 40 consists of a flat plate shield considered a blinder suspended in a vertical condition at either one or both sides of the flap depressor 30. The arrangement is such that the flat plate obstructing means 40 will not engage the articles, cartons or bottles on the elevator platform. On the contrary the means 40 hangs down adjacent the housing 32 and/or 32' for the photo cell 24 and/or the light source 25. The beam obstructing means 40 is just inwardly of the side edges of the flap depressor 30 which ride the ledges 36 and 37 when the stripper bar 20 is withdrawn. The obstructing means 40 projects forwardly and below the free edge 33 of the flap depressor 30 in a position to act as a blinder for obstructing the light beam B at substantially the same time as the top surface of closed cartons would do so as explained above. In this manner, the six packs of bottles as illustrated in FIG. 7 would have their cap end aligned horizontally with the light beam B at substantially the same time that the blinder means 40 cuts off or obstructs the light beam B. The elevator motor M is thereby de-energized and within the slight override of the elevator 17 the capped ends of the bottles stop just below the stripper plate 20. Thus the next layer of six packs of bottles coming from the stripper plate 20 above will be deposited gently on the capped ends of the bottles in the topmost layer of six packs on the elevator 17.

Having thus described the palletizing of open flapped cartons and the like in a conventional pallet loading machine by means of a flap depressor and beam obstructer therefor in specific detail, it will be appreciated that the same may be modified, altered and/or varied without departing from the spirit or scope of the invention therein as called for in the appended claims.

What I claim as new and desire to protect by Letters Patent is:

1. In a palletizer of the type having an elevator for raising and lowering a pallet between the lower and upper end of an elevator shaft in accordance with a coded cycle control in which a light beam emanating at one side of the elevator shaft traverses the latter adjacent its upper end and impinges upon a photo cell electrically connected to the circuit of the coded cycle control to effect stoppage of the elevator upon obstruction of such light beam by a layer of cartons and the like as the elevator arrives in proximity to a horizontally reciprocative plate at the upper end of the elevator shaft and upon withdrawal of such plate from beneath a layer of cartons thereon are deposited onto the layer of cartons on the elevator; the combination therewith of means for facilitating palletizing of open flapped cartons on such palletizer comprising a member extending across the elevator shaft adjacent and parallel to the light beam therein and having one edge parallel to the light beam hingedly connected to the underside of the stripper plate and its opposite end normally disposed at an acute angle relative thereto pendently into the elevator shaft for engaging and depressing the open flap of a carton approaching the light beam.

2. The means for palletizing open flapped cartons in a palletizer in accordance with that of claim 1 in which said member comprises:
   a. hinge means along one long edge of said member hingedly connecting the latter to the underside of the stripper plate for swinging movement about an axis parallel to the light beam; and
   b. means on said member for limiting swinging movement of the latter by gravity beyond a downwardly hanging angular disposition within an acute angle relative to the stripper plate to thereby dispose the opposite free edge of said member in a position for engaging the open flaps of cartons on the elevator about to approach the light beam for pressing such flaps into closed condition incident to arrival of the cartons thereof into obstructing relation to the light beam.

3. The means for palletizing open flapped cartons and the like in accordance with that of claim 2 in which a pair of guide rails at each of said sides of the elevator shaft extend laterally therefrom to guide the stripper plate for withdrawal include ledges engageable by said flap depressing member during withdrawal of the stripper plate for supporting said member in substantial parallelism with the stripper plate during withdrawal thereof.

4. The means for palletizing open flapped cartons and the like in accordance with that of claim 1 including a blinder supported on said member a radial distance from the axis of hinged connection of said one edge thereof to the stripper plate to obstruct the light beam when said member is engaged by the top of bottles in six pack open cartons and the like being elevated by the elevator and adapted upon engagement of bottles extending upwardly beyond the open upper end of their cartons, to obstruct the light beam and effect stoppage of the elevator upon arrival of the tops of such bottles adjacent the underside of the stripper plate.

5. The means for palletizing cartons having bottles extending upwardly of the open upper ends of such cartons in accordance with claim 4 in which said blinder is disposed on said flap depressor such as to obstruct the light beam when the horizontal plane of the cap top ends of the bottles in such cartons reach the horizontal plane of the light beam.

* * * * *